(12) United States Patent
Kim

(10) Patent No.: US 7,570,705 B2
(45) Date of Patent: Aug. 4, 2009

(54) GMSK MODULATION USING A DUAL-PORT MEMORY

(75) Inventor: Young-Sam Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 605 days.

(21) Appl. No.: 11/351,376

(22) Filed: Feb. 10, 2006

(65) Prior Publication Data
US 2006/0182200 A1 Aug. 17, 2006

(30) Foreign Application Priority Data
Feb. 16, 2005 (KR) ............. 10-2005-0012642

(51) Int. Cl.
*H04L 27/00* (2006.01)
(52) U.S. Cl. ............ 375/295; 375/219; 375/305; 375/274; 375/336; 375/222; 375/298; 375/302; 375/223; 332/100; 332/103; 332/102; 332/101
(58) Field of Classification Search ............ 375/295, 375/219, 305, 274, 336, 222, 298, 302, 223; 332/100, 103, 102, 101
See application file for complete search history.

(56) References Cited

U.S. PATENT DOCUMENTS

| 5,144,256 A * | 9/1992 | Lim ............. 329/302 |
| 5,255,288 A | 10/1993 | Ichihara | |
| 6,025,758 A * | 2/2000 | Lu ............. 332/100 |
| 6,631,169 B1 * | 10/2003 | Wu et al. ............. 375/305 |
| 2004/0179630 A1 * | 9/2004 | O'Shea ............. 375/305 |
| 2007/0058749 A1 * | 3/2007 | Eshraghi et al. ............. 375/296 |

FOREIGN PATENT DOCUMENTS

DE 40 36 512 A1 5/1992

(Continued)

OTHER PUBLICATIONS

"Efficient Implementation of an I-Q GMSK Modulator" Alfredo Linz, Member, IEEE, and Alan Hendrickson, IEEE Transactions on Circuit and Systems_II: Analog and Digital Signal Proecessing, vol. 43, No. 1, Jan. 1996.*

(Continued)

*Primary Examiner*—David C Payne
*Assistant Examiner*—Zewdu Kassa
(74) *Attorney, Agent, or Firm*—F. Chau & Associates, LLC

(57) ABSTRACT

A GMSK modulator includes a dual-port memory, an address generator and a signal provider, where the dual-port memory respectively outputs in-phase and quadrature phase waveform data to first and second ports in response to in-phase and quadrature phase waveform address signals, the address generator generates the in-phase and quadrature phase waveform address signals based on a differential encoded bit stream, the signal provider selects one of the in-phase and the quadrature phase waveform data in response to the differential encoded bit stream, and outputs continuous GMSK in-phase and quadrature phase channel signals, and the redundancy of the memory that stores the GMSK in-phase and quadrature phase waveform data may be reduced using the dual-port memory so that the size of the memory may be reduced.

28 Claims, 14 Drawing Sheets

FOREIGN PATENT DOCUMENTS

JP  10-075267  3/1998
KR  1994-27391  12/1994

OTHER PUBLICATIONS

Jestaedt, Bernhard: Patentrecht, ein fallbezogenes Lehrbuch, 5-te Aufl., 2005, Koln, Carl Heymanns Verlag, ISBN 3-452-24929-8, Seite 45ff.

BGH-Beschluss "Mikroprozessor", Ausdruck, vom 14. Marz 2006—XZB May 2004—Bundespatentgericht.

* cited by examiner

FIG. 3

| | I INITIAL SAMPLE (32) | COMMON SAMPLE (34) | | | | | | Q INITIAL SAMPLE (36) |
|---|---|---|---|---|---|---|---|---|
| ROW 0 | 1F4 | 1E5 | 1D1 | 1A4 | 168 | 122 | C8 | 73 | 000 |
| ROW 1 | 1F4 | 1E5 | 1D1 | 1A4 | 168 | 122 | C8 | 74 | 000 |
| ROW 2 | 1F4 | 1EA | 1DB | 1B3 | 186 | 159 | 131 | 118 | 109 |
| ROW 3 | 1F4 | 1EA | 1DB | 1B3 | 186 | 159 | 131 | 119 | 109 |
| ROW 4 | 1A9 | 1A4 | 195 | 172 | 14A | 109 | BE | 69 | 000 |
| ROW 5 | 1A9 | 1A4 | 195 | 172 | 14A | 109 | BE | 70 | 000 |
| ROW 6 | | | | | | | | | |
| ROW 7 | | | | | | | | | |
| ROW 8 | | | | | | | | | |
| ROW 9 | | | | | | | | | |
| ROW 10 | | | | | | | | | |
| ROW 11 | | | | | | | | | |
| ROW 12 | | | | | | | | | |
| ROW 13 | | | | | | | | | |
| ROW 14 | | | | | | | | | |
| ROW 15 | | | | | | | | | |
| | COL0 | COL1 | COL2 | COL3 | COL4 | COL5 | COL6 | COL7 | COL8 |

WAVEFORM PATTERN ADDRESS ↓

I-ADDR SEQUENTIALLY DESIGNATED (42)

Q-ADDR SEQUENTIALLY DESIGNATED VALUE (44)

← SAMPLE ADDRESS →

FIG. 6

| TYPE | ROM ROW INDEX | ADDR[6:3] → [b4 b3 b2 b1] |
|---|---|---|
| A | 0 | 0000 |
| A | 1 | 0001 |
| B | 2 | 0010 |
| B | 3 | 0011 |
| C | 4 | 0100 |
| C | 5 | 0101 |
| D | 6 | 0110 |
| D | 7 | 0111 |
| A | 8 | 1000 |
| A | 9 | 1001 |
| B | 10 | 1010 |
| B | 11 | 1011 |
| C | 12 | 1100 |
| C | 13 | 1101 |
| D | 14 | 1110 |
| D | 15 | 1111 |

FIG. 11

| INPUT BIT | 1-BIT DELAY | DIFF. ENCODING a1 | a2 | a3 | a4 | a5 | a3 | ROW ADDRESS (ROM) b4 | b3 | b2 | b1 | DUAL-PORT MEMORY I-CH PORT (ROW ADDR.NO.) | a3 | a4 | NRZ (y) | QI ALGORITHM | QUADRATURE | I & Q SELECTOR I-CHANNEL DATA |
|---|---|---|---|---|---|---|---|---|---|---|---|---|---|---|---|---|---|---|
| 1 | 0 | 1 | 0 | 0 | 0 | 0 | 0 | 0 | 0 | 0 | 1 | 1 | 0 | 0 | -1 | AI+y | 3 | -Q |
| 1 | 1 | 0 | 1 | 0 | 0 | 0 | 0 | 0 | 0 | 1 | 0 | 2 | 0 | 0 | -1 | AI+y | 2 | -I |
| 0 | 1 | 1 | 0 | 1 | 0 | 0 | INVERSION | 1 | 1 | 1 | 0 | 14 | 1 | 0 | 1 | AI | 2 | -Q |
| 1 | 0 | 1 | 1 | 0 | 1 | 0 | 0 | 0 | 1 | 1 | 1 | 7 | 0 | 1 | -1 | AI | 2 | -I |
| 1 | 1 | 1 | 1 | 1 | 0 | 1 | INVERSION | 0 | 1 | 0 | 1 | 5 | 1 | 1 | 1 | AI | 2 | -Q |
| 0 | 1 | 0 | 0 | 1 | 1 | 0 | INVERSION | 1 | 0 | 1 | 0 | 10 | 1 | 1 | 1 | AI+y | 3 | -I |
| 1 | 0 | 1 | 0 | 0 | 1 | 1 | 0 | 1 | 1 | 1 | 1 | 15 | 0 | 1 | -1 | AI | 3 | -Q |
| 0 | 1 | 0 | 1 | 0 | 0 | 1 | INVERSION | 0 | 1 | 0 | 0 | 4 | 1 | 0 | 1 | AI | 3 | -I |
| 1 | 0 | 1 | 0 | 1 | 0 | 0 | INVERSION | 1 | 0 | 0 | 0 | 8 | 1 | 1 | 1 | AI+y | 0 | Q |
| 0 | 1 | 0 | 1 | 0 | 1 | 0 | INVERSION | 0 | 0 | 0 | 0 | 0 | 1 | 1 | 1 | AI+y | 1 | -I |
| 1 | 0 | 1 | 0 | 1 | 0 | 1 | 0 | 0 | 0 | 0 | 1 | 1 | 0 | 1 | -1 | AI | 2 | -Q |
| 0 | 1 | 0 | 1 | 0 | 1 | 0 | 0 | 1 | 1 | 0 | 1 | 13 | 0 | 0 | -1 | AI+y | 3 | -I |
| 1 | 0 | 1 | 0 | 1 | 0 | 1 | INVERSION | 1 | 0 | 1 | 0 | 10 | 1 | 1 | 1 | AI+y | 2 | -Q |
| 0 | 1 | 0 | 1 | 0 | 1 | 0 | 0 | 1 | 1 | 1 | 0 | 14 | 0 | 1 | -1 | AI | 2 | -I |
| 1 | 0 | 1 | 0 | 1 | 0 | 1 | 0 | 0 | 1 | 1 | 1 | 7 | 1 | 0 | 1 | AI | 2 | -Q |
| 0 | 1 | 0 | 1 | 0 | 1 | 0 | INVERSION | 0 | 1 | 0 | 1 | 5 | 1 | 1 | 1 | AI | 3 | -I |
| 1 | 0 | 1 | 1 | 1 | 1 | 1 | INVERSION | 0 | 1 | 0 | 0 | 4 | 1 | 0 | 1 | AI | 3 | -I |
| 0 | 1 | 1 | 1 | 1 | 1 | 1 | INVERSION | 1 | 0 | 0 | 0 | 8 | 1 | 1 | 1 | AI+y | 0 | Q |
| 0 | 0 | 1 | 1 | 1 | 1 | 1 | INVERSION | 0 | 0 | 0 | 1 | 1 | 1 | 1 | 1 | AI+y | 2 | -Q |
| 0 | 0 | 0 | 1 | 1 | 1 | 1 | INVERSION | 0 | 0 | 1 | 1 | 3 | 1 | 1 | 1 | AI+y | 3 | -I |

FIG. 12

| INPUT BIT | 1-BIT DELAY | DIFF. ENCODING | ROW ADDRESS (ROM) a1 a2 a3 a4 a5 | a3 | ROW ADDRESS (ROM) b4 b3 b2 b1 | DUAL-PORT MEMORY Q-CH PORT (ROW ADDR. NO.) | a3 a4 | NRZ (y) | QI ALGORITHM | QUADRATURE | I & Q SELECTOR Q-CHANNEL DATA |
|---|---|---|---|---|---|---|---|---|---|---|---|
| 1 | 0 | 1 | 1 0 0 0 0 | 0 | 0 0 0 1 | 1 | 0 0 | −1 | AI+y | 3 | −I |
| 1 | 1 | 0 | 0 1 0 0 0 | 0 | 0 1 0 0 | 4 | 0 0 | −1 | AI+y | 2 | −Q |
| 0 | 1 | 1 | 1 0 1 0 0 | 1 INVERSION | 1 1 1 0 | 14 | 1 0 | 1 | AI | 2 | −I |
| 1 | 0 | 1 | 0 0 1 1 0 | 0 | 0 1 1 1 | 7 | 0 1 | −1 | AI | 2 | −Q |
| 1 | 1 | 1 | 1 1 0 1 0 | 1 INVERSION | 0 0 1 1 | 3 | 1 0 | 1 | AI | 2 | −I |
| 0 | 1 | 0 | 0 1 1 1 0 | 1 INVERSION | 1 1 0 0 | 12 | 1 1 | −1 | AI | 3 | Q |
| 1 | 0 | 1 | 1 0 1 1 0 | 0 | 1 1 1 1 | 15 | 0 1 | 1 | AI | 3 | −Q |
| 0 | 1 | 1 | 1 1 0 1 0 | 1 INVERSION | 0 0 1 0 | 2 | 1 0 | −1 | AI+y | 3 | −I |
| 0 | 0 | 0 | 0 1 1 0 1 | 1 INVERSION | 1 0 0 0 | 8 | 1 1 | 1 | AI | 0 | −I |
| 0 | 0 | 1 | 0 0 1 0 1 | 1 INVERSION | 0 0 0 0 | 0 | 1 0 | 1 | AI+y | 1 | −Q |
| 1 | 0 | 1 | 1 0 0 1 1 | 0 | 0 0 0 1 | 1 | 0 0 | −1 | AI+y | 2 | −I |
| 0 | 1 | 1 | 0 1 0 0 1 | 0 | 0 1 0 1 | 5 | 0 1 | 1 | AI | 3 | Q |
| 1 | 0 | 1 | 1 0 1 1 1 | 1 INVERSION | 1 0 1 1 | 11 | 1 1 | −1 | AI | 3 | −I |
| 1 | 1 | 0 | 0 1 1 1 1 | 1 INVERSION | 1 1 0 0 | 12 | 1 1 | −1 | AI | 2 | −Q |
| 0 | 1 | 1 | 1 0 1 1 1 | 1 INVERSION | 1 1 1 0 | 14 | 1 1 | 1 | AI | 2 | −I |
| 1 | 0 | 1 | 0 0 1 1 1 | 0 | 0 1 1 1 | 7 | 0 1 | −1 | AI | 2 | −Q |
| 1 | 1 | 1 | 1 1 0 1 1 | 1 INVERSION | 0 0 1 1 | 3 | 1 0 | 1 | AI | 2 | −I |
| 0 | 1 | 0 | 0 1 1 1 1 | 1 INVERSION | 1 1 0 0 | 12 | 1 1 | −1 | AI | 3 | Q |
| 1 | 0 | 1 | 1 0 1 1 1 | 1 INVERSION | 1 1 1 1 | 15 | 0 1 | 1 | AI | 3 | −Q |
| 0 | 1 | 1 | 1 1 0 1 1 | 1 INVERSION | 0 0 1 0 | 2 | 1 0 | −1 | AI+y | 3 | −I |
| 0 | 0 | 0 | 0 1 1 0 1 | 1 INVERSION | 1 0 0 0 | 8 | 1 1 | 1 | AI | 0 | −I |
| 0 | 0 | 1 | 0 0 1 0 1 | 1 INVERSION | 0 0 0 0 | 0 | 1 0 | 1 | AI+y | 1 | −Q |
| 1 | 0 | 1 | 1 0 0 1 1 | 0 | 0 0 0 1 | 1 | 0 0 | −1 | AI+y | 2 | −I |
| 0 | 1 | 1 | 0 1 0 0 1 | 0 | 0 1 0 1 | 5 | 0 1 | 1 | AI | 3 | Q |

GMSK MODULATION USING A DUAL-PORT MEMORY

CROSS-REFERENCE TO RELATED APPLICATION

This application claims foreign priority under 35 U.S.C. § 119 to Korean Patent Application No. 2005-12642 filed on Feb. 16, 2005 in the Korean Intellectual Property Office (KIPO), the entire contents of which are hereby incorporated by reference.

BACKGROUND OF THE INVENTION

1. Field of the Invention

The present disclosure relates to modulators and modulation methods, and more specifically to modulators and modulation methods using a dual-port memory.

2. Description of the Related Art

A Gaussian Minimum Shift Keying (GMSK) modulation adopts a Gaussian filter and is widely used in mobile communication systems, such as Global System for Mobile Communications (GSM), Bluetooth, Mobile LAN, and the like. GMSK modulation adopts the Gaussian filter, thereby having low side lobes compared with those of Quadrature Phase Shift Keying (QPSK) modulation and Minimum Shift Keying (MSK) modulation.

GMSK modulation adopts a look-up table to generate a GMSK waveform signal corresponding to a digital input bit stream instead of performing complicated calculations to generate the GMSK waveform signal, so that high-speed GMSK modulation may be obtained. The look-up table respectively stores data corresponding to an in-phase GMSK waveform signal and data corresponding to a quadrature phase GMSK waveform signal.

U.S. Pat. No. 5,255,288 discloses a GMSK modulator that has a first read-only memory (ROM) look-up table and a second ROM look-up table respectively storing in-phase waveform data and quadrature phase waveform data. According to the U.S. Pat. No. 5,255,288, the number of word lines is reduced from 1,024 to 256 so as to reduce a size of the ROMs.

U.S. Pat. No. 5,954,787 discloses a GMSK modulator in which the look-up table stores data corresponding to a ¼ period of a periodic waveform signal and stores only one of sine function values and cosine function values, so that the capacity of memory needed for the look-up table can be decreased.

United States Patent Application Publication No. 2004/0179630 discloses a GMSK modulator that uses a mapping logic and has a look-up table of which a size corresponds to a half of a size of data corresponding to a GMSK waveform signal, so that the capacity of memory needed for the look-up table can be decreased.

As described above, various methods for decreasing the capacity of memory needed for the look-up table have been developed.

SUMMARY OF THE INVENTION

Exemplary embodiments of the present disclosure provide apparatuses and methods of generating waveform data, which can decrease the amount of memory required by reducing the quantity of the data stored in a dual-port memory based on symmetric characteristics of an in-phase waveform signal and a quadrature phase signal.

Exemplary embodiments of the present disclosure also provide Gaussian Minimum Shift Keying (GMSK) modulators and GMSK modulation methods using the apparatuses and methods of generating a waveform signal.

Exemplary embodiments of the present disclosure also provide mobile communication devices and mobile communication methods using the GMSK modulators and GMSK modulation methods.

In some exemplary embodiments, a method of generating waveform data includes: storing $2^m$ in-phase waveform patterns having $2^n$ k-bit samples S1 ($\theta i$) ($0 \leq \theta i \leq \pi/2$) in a first region of a dual-port memory, the dual-port memory having a size of k-bit$\times 2^m$ rows$\times(2^n+1)$ columns, the first region corresponding to $2^m$ rows$\times 2^n$ columns, wherein k, m and n are natural numbers; storing an initial sample S ($\theta_0$) of $2^m$ quadrature phase waveform patterns in a second region of the dual-port memory, the $2^m$ quadrature phase waveform patterns having $2^n$ k-bit samples S2 ($\theta i$) ($0 \leq \theta i \leq \pi/2$) and having symmetric characteristics with respect to the $2^m$ in-phase waveform patterns, the second region corresponding to a $(2^n+1)$th column region; converting an input bit stream into (p+q+1)-bit parallel data having at least one previous bit (p), a present bit, and at least one next bit (q), wherein m=p+q; generating (p+q)-bit data or an inverted (p+q)-bit data in response to a logic status of a present bit of the (p+q+1)-bit parallel data, the (p+q)-bit data having the at least one previous bit and the at least one next bit, but not the present bit; generating a first address signal for sequentially allocating $2^n$ in-phase samples of a designated row to a first column through a $2^n$th column in response to the (p+q)-bit data or the inverted (p+q)-bit data; generating a second address signal for allocating, in a reverse sequence, $2^n$ quadrature phase samples of the designated row to the $2^n$th column through a second column in response to the (p+q)-bit data or the inverted (p+q)-bit data; outputting in-phase samples, which are accessed in response to the first address signal, to a first port of the dual-port memory; and outputting quadrature phase samples, which are accessed in response to the second address signal, to a second port of the dual-port memory.

In further embodiments, p and q may be 2, respectively. The $2^m$ in-phase waveform patterns may be divided into four groups, and each of the four groups may have the same waveform pattern. A first group may be stored in rows 0, 1, 8 and 9 of the dual-port memory, a second group may be stored in rows 2, 3, 10 and 11 of the dual-port memory, a third group may be stored in rows 4, 5, 12 and 13 of the dual-port memory, and a fourth group may be stored in rows 6, 7, 14 and 15 of the dual-port memory.

Particularly, a fixed waveform patterns that is generated from a GMSK modulator by using a Gaussian Low Pass Filter satisfying BT=03 may be stored in the dual-port memory according to the embodiments.

The $2^m$ quadrature phase waveform patterns may be divided into four groups, and each of the four groups may have the same waveform pattern. First and fourth groups of the $2^m$ quadrature phase waveform patterns may symmetrically correspond to the first and the fourth groups of the $2^m$ in-phase waveform patterns, a second group of the $2^m$ quadrature phase waveform patterns may correspond to the third group of the $2^m$ in-phase waveform patterns, and a third group of the $2^m$ quadrature phase waveform patterns may correspond to the second group of the $2^m$ in-phase waveform patterns.

In some embodiments of the present disclosure, an apparatus for generating waveform data includes: a dual-port memory that stores $2^m$ in-phase waveform patterns having $2^n$ k-bit samples S1 ($\theta i$) ($0 \leq \theta i \leq \pi/2$) in a first region of a dual-port memory and stores an initial sample S ($\theta_0$) of $2^m$ quadrature phase waveform patterns in a second region of the dual-port memory, the dual-port memory having a size of k-bit×$2^m$ rows×($2^n$+1) columns, the first region corresponding to $2^m$ rows×$2^n$ columns, wherein k, m and n are natural numbers, the $2^m$ quadrature phase waveform patterns having $2^n$ k-bit samples S2 ($\theta$i) ($0 \leq \theta i \leq \pi/2$) and having symmetric characteristics with respect to the $2^m$ in-phase waveform patterns, the second region corresponding to a ($2^n$+1)th column region; a serial-to-parallel converter configured to convert an input bit stream into (p+q+1)-bit parallel data having at least one previous bit (p), a present bit, and at least one next bit (q), wherein m=p+q; a bit decision block configured to generate (p+q)-bit data or an inverted (p+q)-bit data in response to a logic status of a present bit of the (p+q+1)-bit parallel data, the (p+q)-bit data having the at least one previous bit and the at least one next bit, but not the present bit; a first address generator configured to generate a first address signal for sequentially allocating $2^n$ in-phase samples of a designated row to a first column through a $2^n$th column in response to the (p+q)-bit data or the inverted (p+q)-bit data; and a second address generator configured to generate a second address signal for allocating, in a reverse sequence, $2^n$ quadrature phase samples of the designated row to the $2^n$th column through a second column in response to the (p+q)-bit data or the inverted (p+q)-bit data, wherein the apparatus outputs in-phase samples, which are accessed in response to the first address signal, to a first port of the dual-port memory, and outputs quadrature phase samples, which are accessed in response to the second address signal, to a second port of the dual-port memory.

The serial-to-parallel converter may include a 5-bit shift register configured to shift the input bit stream to output 5-bit parallel data. The first address generator may include: an up-counter configured to up-count a clock signal having a frequency $2^n$ times as high as a frequency of the serial-to-parallel converter to sequentially generate an n-bit count value in a range from 0 to ($2^n$−1); and a first register configured to store the (p+q)-bit data or the inverted (p+q)-bit data at upper (p+q) bits of the first register, configured to store the n-bit count value at lower n bits of the first register, and configured to sequentially generate ($2^n$−1)(p+q+n)-bit first address signals. The second address generator may include: a down-counter configured to down-count the clock signal having a frequency $2^n$ times as high as a frequency of the serial-to-parallel converter to sequentially generate an n-bit count value in a range from ($2^n$−1) to 1; an adder configured to add the n-bit value to a logic '1'; and a second register configured to store the (p+q)-bit data or the inverted (p+q)-bit data at upper (p+q) bits of the second register, configured to store an output of the adder at lower (n+1) bits of the second register, and configured to sequentially generate (p+q+n+1)-bit second address signals.

In some embodiments of the present disclosure, a modulator includes: a dual-port memory configured to respectively output in-phase waveform data and quadrature phase waveform data to a first port and a second port in response to an in-phase waveform address signal and a quadrature phase waveform address signal, the in-phase waveform data and quadrature phase waveform data being stored in the dual-port memory; an address generator configured to generate the in-phase waveform address signal and the quadrature phase waveform address signal based on a differential encoded bit stream; and a signal provider configured to select one of the in-phase waveform data and the quadrature phase waveform data in response to the differential encoded bit stream, and configured to output a continuous GMSK in-phase channel signal and a continuous GMSK quadrature phase channel signal.

The waveform pattern data stored in the dual-port memory respectively includes a plurality of in-phase waveform pattern samples (S1 ($\theta$i)) and a plurality of quadrature phase waveform pattern samples (S2 ($\theta$i)), wherein $0 \leq \theta i \leq \pi/2$. An initial sample value of the in-phase waveform pattern samples, common sample values of the in-phase and quadrature phase waveform pattern samples, and an initial sample value of the quadrature phase waveform pattern samples may be stored in the dual-port memory in the order named. The initial sample value of the in-phase waveform pattern samples and the common sample values of the in-phase waveform pattern samples may be sequentially stored in the dual-port memory, and the initial sample value of the quadrature phase waveform pattern samples and the common sample values of the quadrature phase waveform pattern samples may be stored in the dual-port memory, in which the common sample values of the quadrature phase waveform pattern samples are stored in a reverse sequence in the dual-port memory.

In further embodiments, the address generator may include a serial-to-parallel converter outputting parallel data having at least one previous bit of the differential encoded bit stream, a present bit of the differential encoded bit stream and at least one next bit of the differential encoded bit stream, a pattern selector for generating at least one waveform pattern selection signal for designating one of the in-phase and quadrature phase waveform pattern samples in response to the present bit, an in-phase address generator for generating an in-phase address signal that sequentially designates each of sample values of the in-phase and quadrature phase waveform pattern samples selected by the at least one waveform pattern selection signal, and a quadrature phase address generator for generating a quadrature phase address signal that designates in a reverse sequence each of the sample values of the in-phase and quadrature phase waveform pattern samples selected by the at least one waveform pattern selection signal.

In a modulation method according to some embodiments of the present disclosure, a dual-port memory is prepared, in which in-phase waveform data and quadrature phase waveform data are stored, the dual-port memory respectively outputting the in-phase waveform data and the quadrature phase waveform data to a first port and a second port in response to an in-phase waveform address signal and a quadrature phase waveform address signal. The in-phase waveform address signal and the quadrature phase waveform address signal are generated based on a differential encoded bit stream. One of the in-phase waveform data and the quadrature phase waveform data is selected in response to the differential encoded bit stream to output a continuous GMSK in-phase channel signal and a continuous GMSK quadrature phase channel signal.

In some embodiments of the present disclosure, a digital wireless communication device includes: a digital Gaussian Minimum Shift Keying (GMSK) modulator including a dual-port memory and a signal provider, the dual-port memory storing $2^m$ in-phase waveform patterns having $2^n$ k-bit samples S1 ($\theta$i) ($0 \leq \theta i \leq \pi/2$) in a first region of the dual-port memory and storing an initial sample S ($\theta_0$) of $2^m$ quadrature phase waveform patterns in a second region of the dual-port memory, the dual-port memory having a size of k-bit×$2^m$ rows×($2^n$+1) columns, the first region corresponding to $2^m$ rows×$2^n$ columns, wherein k, m and n are natural numbers, the $2^m$ quadrature phase waveform patterns having $2^n$ k-bit samples S2 ($\theta$i) ($0 \leq \theta i \leq \pi/2$) and having symmetric characteristics with respect to the $2^m$ in-phase waveform patterns, the second region corresponding to a ($2^n$+1)th column region, the signal provider selecting one of in-phase waveform data and quadrature phase waveform data read from the dual-port memory in response to an input bit stream and outputting a continuous GMSK in-phase channel signal and a continuous GMSK quadrature phase channel signal; a digital-to-analog converter configured to convert the GMSK in-phase channel signal and the GMSK quadrature phase channel signal into analog signals; and a transmitter configured to transmit the analog signals.

In some embodiments of the present disclosure, a digital wireless communication method includes: storing $2^m$ in-phase waveform patterns having $2^n$ k-bit samples S1 ($\theta$i) ($0 \leq \theta i \leq \pi/2$) in a first region of a dual-port memory, the dual-port memory having a size of k-bit×$2^m$ rows×($2^n$+1) columns, the first region corresponding to $2^m$ rows×$2^n$ columns, wherein k, m and n are natural numbers; storing an initial sample S ($\theta_0$) of $2^m$ quadrature phase waveform patterns in a second region of the dual-port memory, the $2^m$ quadrature phase waveform patterns having $2^n$ k-bit samples S2 ($\theta$i) ($0 \leq \theta i \leq \pi/2$) and having symmetric characteristics with respect to the $2^m$ in-phase waveform patterns, the second region corresponding to a ($2^n$+1)th column region; selecting one of in-phase waveform data and quadrature phase waveform data read from the dual-port memory in response to an input bit stream to output a continuous GMSK in-phase channel signal and a continuous GMSK quadrature phase channel signal; converting the GMSK in-phase channel signal and the GMSK quadrature phase channel signal into analog signals; and transmitting the analog signals.

BRIEF DESCRIPTION OF THE DRAWINGS

Exemplary embodiments of the present disclosure will become more apparent by describing in detail exemplary embodiments of the present disclosure with reference to the accompanying drawings, in which:

FIG. 3 is a schematic diagram showing a mapping status and an addressing method of a dual-port memory according to an exemplary embodiment of the present disclosure;

FIG. 6 is a table showing a row addressing method of the dual-port memory depending upon the four types of GMSK waveform signals;

FIGS. 11 and 12 are tables showing modulation processes for generating the I-channel waveform and Q-channel waveform.

DETAILED DESCRIPTION OF PREFERRED EMBODIMENTS

Figure 1:
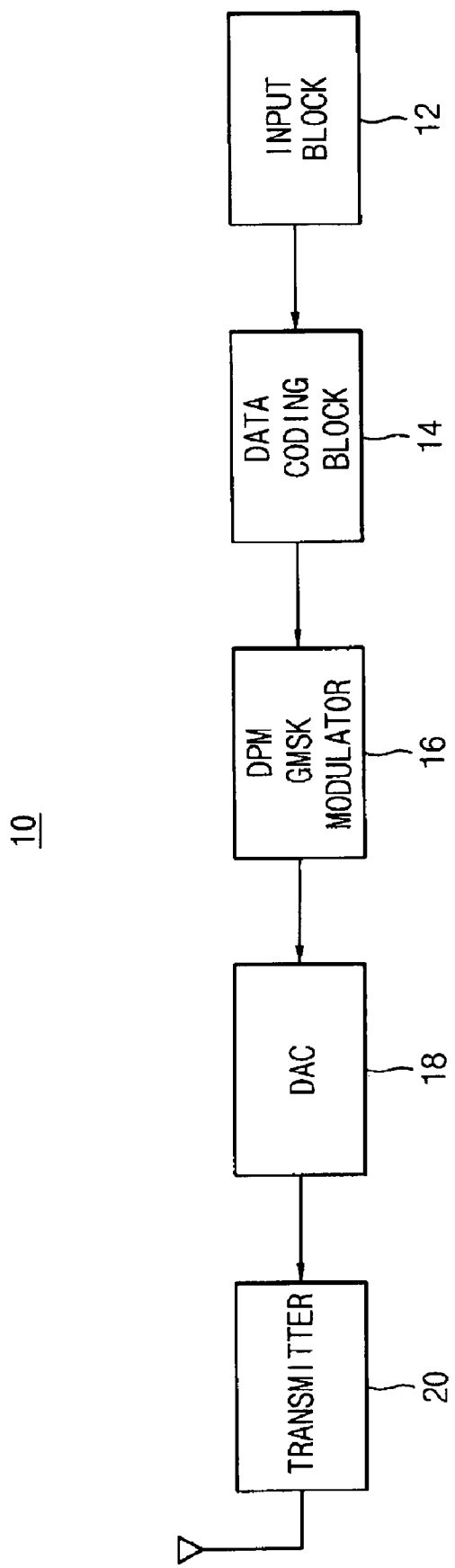
FIG. 1 is a block diagram illustrating a mobile communication device having a Dual-Port Memory-Gaussian Minimum Shift Keying (DPM-GMSK) modulator according to an exemplary embodiment of the present disclosure.

Exemplary embodiments of the present disclosure are disclosed herein, including modulators and modulation methods that use a dual-port memory or are capable of reducing a size of a lookup table that stores data corresponding to a Gaussian Minimum Shift Keying (GMSK) waveform. Specific structural and functional details disclosed herein are merely representative for purposes of describing exemplary embodiments, however, the present invention may be embodied in many alternate forms and should not be construed as limited to the exemplary embodiments of the present disclosure set forth herein.

Accordingly, while the embodiments of the present disclosure are susceptible to various modifications and alternative forms, specific exemplary embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the pertinent art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram illustrating a mobile communication device having a Dual-Port Memory-Gaussian Minimum Shift Keying (DPM-GMSK) modulator according to an exemplary embodiment of the present disclosure. Referring to FIG. 1, the mobile communication device is indicated generally by the reference numeral 10. The mobile communication device 10 includes an input block 12, a data coding block 14, a DPM-GMSK modulator 16, a Digital-to-Analog Converter (DAC) 16 and a transmitter 20.

The input block 12 converts an analog voice signal into digital voice data to provide the data coding block 14 with the digital voice data or key input information. The data coding block 14 encodes the digital voice data or the key input information into a data bit stream. The DPM-GMSK modulator 16 receives the data bit stream and generates a GMSK waveform signal that is stored in a dual-port memory. The dual-port memory stores samples of a ¼ period waveform pattern. The samples of the ¼ period waveform pattern correspond to samples of the ¼ period of the GMSK waveform signal. The DAC 16 converts the GMSK waveform signal into an analog waveform signal. The analog waveform signal is provided to the transmitter 20 as an analog baseband signal. The transmitter 20 mixes the analog baseband signal and a carrier signal, amplifies the power of the mixed signal, and transmits the amplified signal via an antenna.

Figure 2:
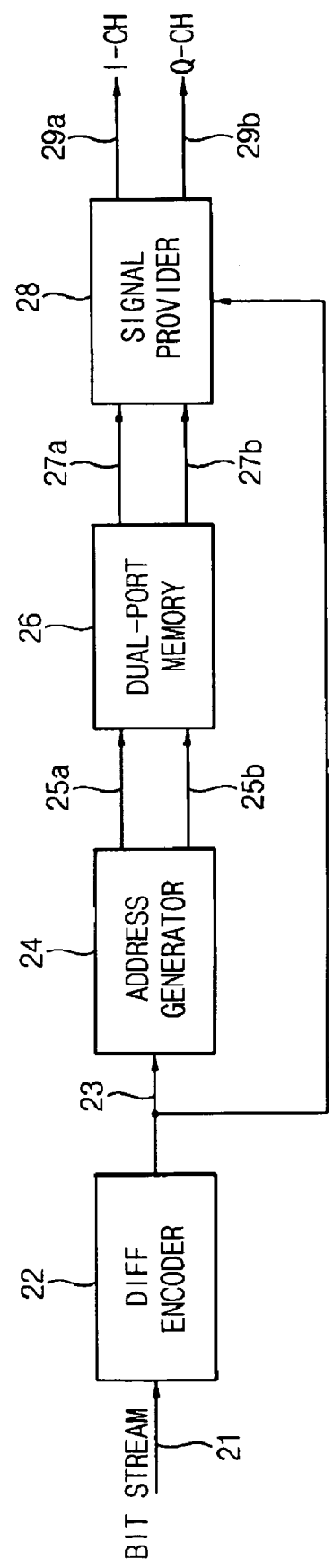
FIG. 2 is a block diagram illustrating the DPM-GMSK modulator of FIG. 1.

FIG. 2 is a block diagram illustrating the DPM-GMSK modulator 16 of FIG. 1. The DPM-GMSK modulator 16 includes a differential encoder 22, an address generator 24, a dual-port memory 26 and a signal provider 28.

The differential encoder 22 generates a differential encoded bit stream 23 based on the data bit stream 21. The address generator 24 generates an in-phase waveform address signal 25a and a quadrature phase waveform address signal 25b based on the differential encoded bit stream 23. The dual-port memory 26 outputs in-phase waveform data 27a and quadrature phase waveform data 27b to a first port and a second port in response to the in-phase waveform address signal 25a and the quadrature phase waveform address signal 25b.

The signal provider 28 selects one of the in-phase waveform data 27a and the quadrature phase waveform data 27b in response to the differential encoded bit stream 23 and outputs a continuous GMSK in-phase channel signal 29a and a continuous GMSK quadrature phase channel signal 29b.

FIG. 3 is a schematic diagram showing a mapping status and an addressing method of a dual-port memory according to an exemplary embodiment of the present disclosure. Referring to FIG. 3, sixteen waveform pattern data stored in the dual-port memory 26 includes eight in-phase waveform pattern samples (S1 (θi)) (0≦θi≦π/2) and eight quadrature phase waveform pattern samples (S2 (θi)) (0≦θi≦π/2). An initial sample value 32 of the eight in-phase waveform pattern samples, common sample values 34 of the eight in-phase and eight quadrature phase waveform pattern samples, and an initial sample value 36 of the eight quadrature phase waveform pattern samples are stored in a corresponding row of the dual-port memory 26 in the order named. The initial sample value 32 of the eight in-phase waveform pattern samples and the seven common sample values 34 of the eight in-phase waveform pattern samples are sequentially stored in a corresponding row of the dual-port memory 26 along a direction 42. The initial sample value 36 of the eight quadrature phase waveform pattern samples and the seven common sample values 34 of the eight quadrature phase waveform pattern samples are sequentially stored in a corresponding row of the dual-port memory 26 along the direction 42.

Figure 4:
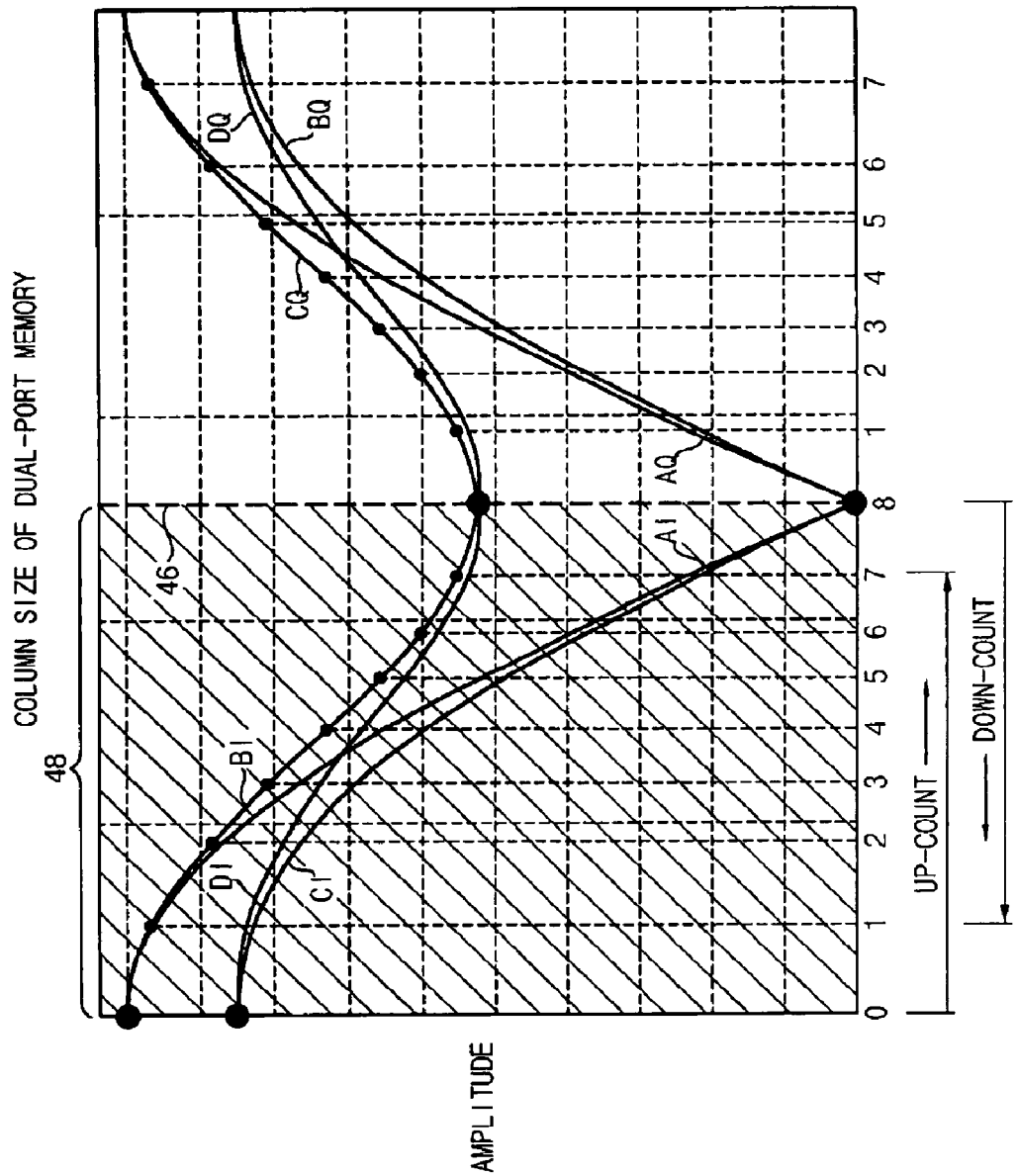
FIG. 4 is a graph illustrating symmetry characteristics of four waveform signals stored in the dual-port memory.

FIG. 4 is a graph illustrating symmetry characteristics of four waveform signals stored in the dual-port memory. Referring to FIG. 4, four in-phase waveform patterns (AI, BI, CI, DI) have decreasing slopes, and four quadrature phase waveform patterns (AQ, BQ, CQ, DQ) have increasing slopes. The in-phase waveform patterns (AI, BI, CI, DI) and quadrature phase waveform patterns (AQ, BQ, CQ, DQ) have symmetric characteristics with respect to a reference axis 46.

AI:AQ
BI:CQ
CI:BQ
DI:DQ

Thus, the GMSK modulator according to an exemplary embodiment of the present disclosure does not include an I-ROM look-up table and a Q-ROM look-up table respectively, but does include a dual-port memory that stores I-ROM samples and Q-ROM initial samples, so that the capacity of memory needed for the look-up table can be decreased by a ½ size due to the symmetry characteristics. Accordingly, a column address is up-counted from zero to seven so as to read I sample values, and the column address is down-counted from eight to one so as to read Q sample values.

Figure 5A:
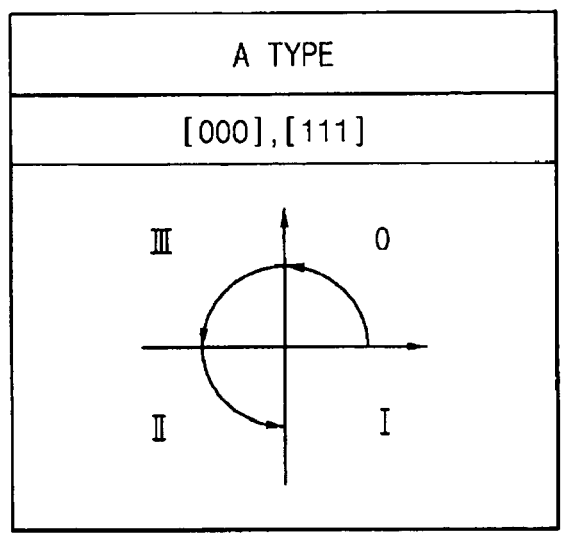
FIGS. 5A through 5D are schematic diagrams illustrating four types of GMSK waveform signals depending upon a combination of input bits according to an exemplary embodiment of the present disclosure.
Figure 5B:
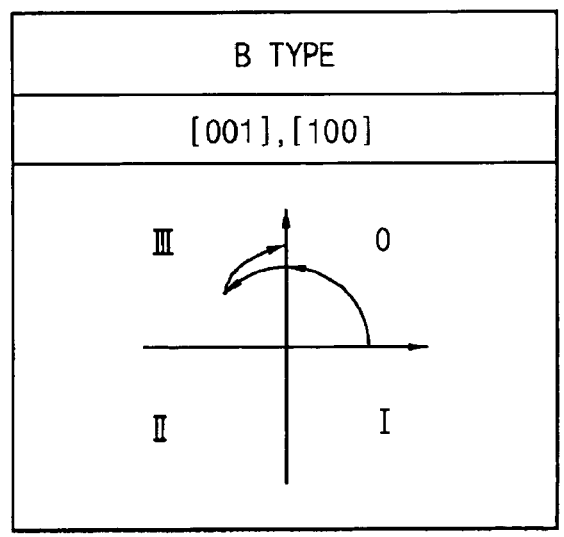
Figure 5C:
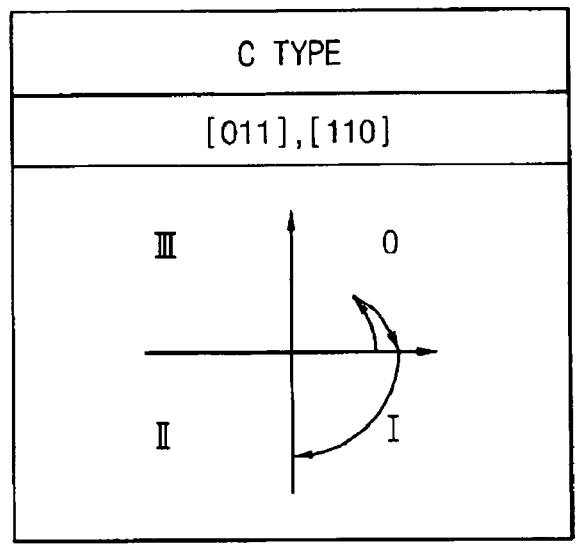
Figure 5D:
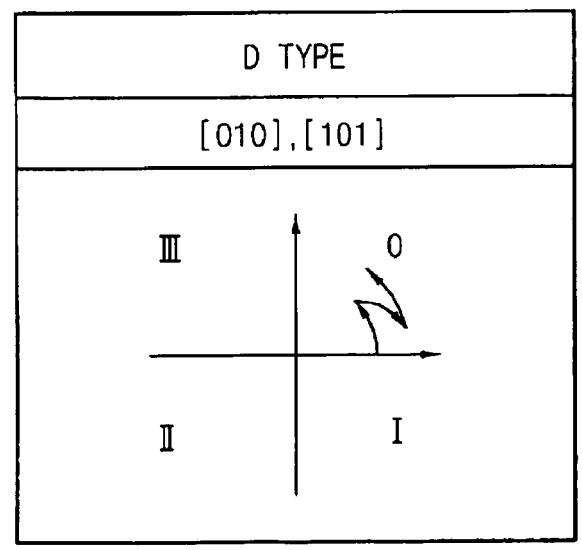

FIGS. 5A through 5D are schematic diagrams illustrating four types of GMSK waveform signals depending upon a combination of input bits according to an exemplary embodiment of the present disclosure. In this case a quadrature increases clockwise, such as a quadrature '0', a quadrature '1', a quadrature '2' and a quadrature '3'. A type of the waveform signal corresponds to an increasing type when a status of a present bit is a logic status '0', and corresponds to a decreasing type when the status of the present bit is a logic status '1'. As shown in FIG. 5A, an 'A' type (AI, AQ) of the waveform signals has the largest variation, and varies in an order (or sequence) of the quadrature '0', the quadrature '3', and the quadrature '2'. As shown in FIG. 5B, a 'B' type (BI, CQ) of the waveform signals varies in an order (or sequence) of the quadrature '0', the quadrature '3', and the quadrature '0'. As shown in FIG. 5C, a 'C' type (CI, BQ) of the waveform signals varies in an order (or sequence) of the quadrature '0', the quadrature '0', and the quadrature '1'. As shown in FIG. 5D, a 'D' type (DI, DQ) of the waveform signals has the smallest variation and varies within the quadrature '0'.

FIG. 6 is a table showing a row addressing method of the dual-port memory depending upon the four types of GMSK waveform signals. As shown in FIG. 6, the 'A' type data of the sixteen waveform pattern data are stored in rows '0', '1', '8', '9'; the 'B' type data of the sixteen waveform pattern data are stored in rows '2', '3', '10', '11'; the 'C' type data of the sixteen waveform pattern data are stored in rows '4', '5', '12', '13'; and the 'D' type data of the sixteen waveform pattern data are stored in rows '6', '7', '14', '15'.

Figure 7:
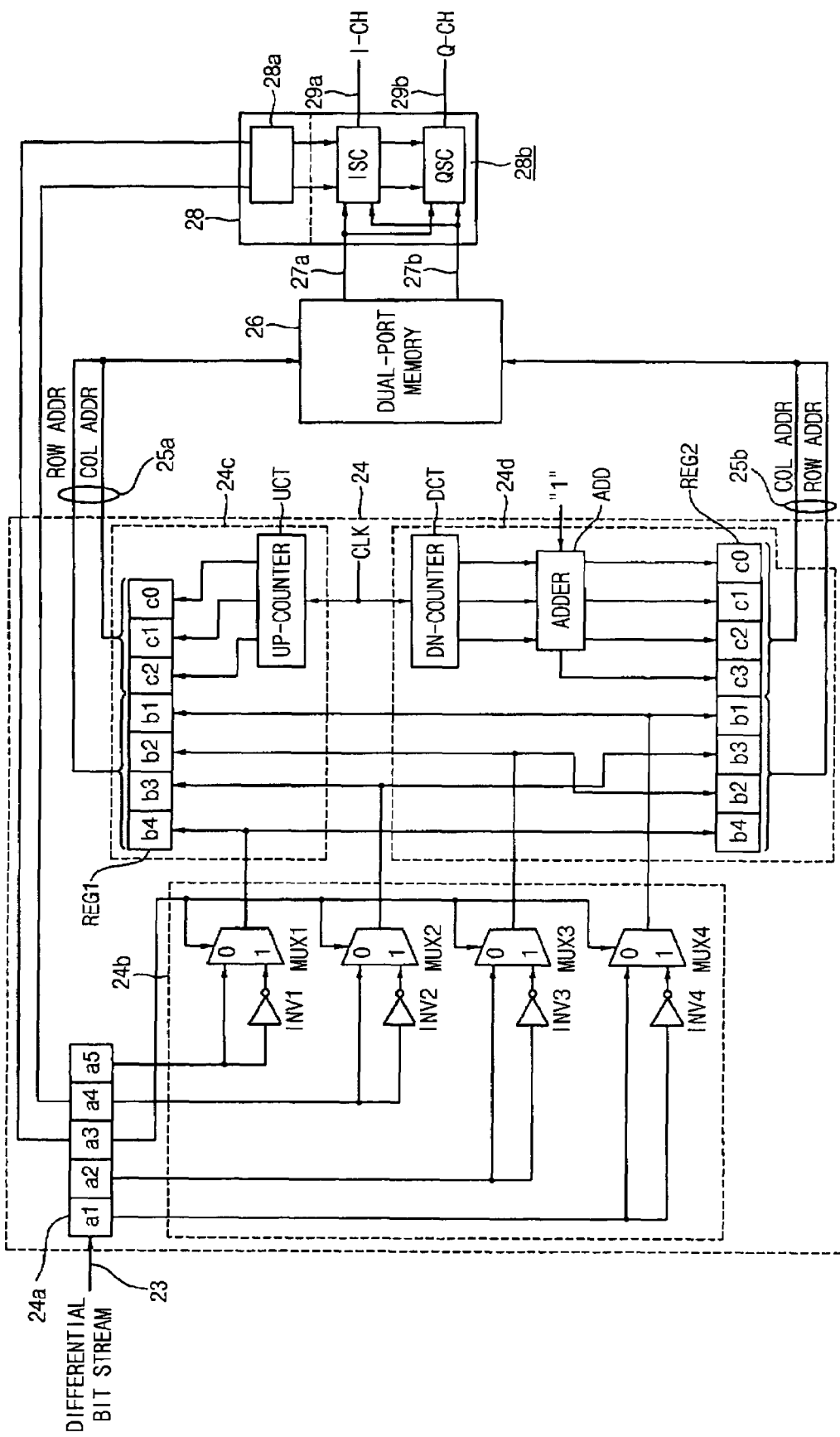
FIG. 7 is a block diagram illustrating an address generator of FIG. 2 according to an exemplary embodiment of the present disclosure.

FIG. 7 is a block diagram illustrating an address generator of FIG. 2 according to an exemplary embodiment of the present disclosure. Referring to FIG. 7, the address generator 24 includes a serial-to-parallel converter 24a, a pattern selector 24b, an in-phase address generator 24c and a quadrature phase address generator 24d.

The serial-to-parallel converter 24a may include a 5-bit shift register. The 5-bit shift register outputs 5-bit parallel data a1, a2, a3, a4 and a5 of the differential encoded bit stream 23. The data a1 and a2 represents previous bits of the differential encoded bit stream 23, the data a3 represents a present bit of the differential encoded bit stream 23, and the data a4 and a5 represent next bits of the differential encoded bit stream 23. It is assumed that a sampling frequency of the GMSK modulator is about 2.17 MHz (8 times high as an input data rate) when the input data rate is about 270.833 KHz.

The pattern selector (or a bit decision block) 24b includes four inverters INV1 through INV4, and four multiplexers MUX1 through MUX4, and generates waveform pattern selection signals b1, b2, b3 and b4 in response to the present bit a3. One of sixteen waveform pattern data is selected based on the waveform pattern selection signals b1, b2, b3 and b4. When the present bit a3 has a logic status '0', the previous bits (data a1 and a2) and the next bits (data a4 and a5) are outputted as the waveform pattern selection signals b1, b2, b3 and b4. When the present bit a3 has a logic status '1', inverted previous bits (data /a1 and /a2) and inverted next bits (data /a4 and /a5) are outputted as the waveform pattern selection signals b1, b2, b3 and b4.

The in-phase address generator 24c includes a 7-bit register REG1 and an up-counter UCT. The up-counter UCT up-counts clock signal CLK to generate 3-bit up-count values. The initial value of the up-counter UCT is '000'. The 3-bit up-count values are inputted to the lower 3 bits c2, c1 and c0 of the register REG1. The waveform pattern selection signals b4, b3, b2 and b1 are inputted to the upper 4 bits of the register REG1.

The 7-bit register REG1 generates a 7-bit in-phase address signal 25a every period of the clock signal CLK. The quadrature phase address generator 24d includes an 8-bit register REG2, a down-counter DCT and an adder ADD. The down-counter DCT down-counts the clock signal CLK to generate 3-bit down-count values. The initial value of the down-counter UCT is '111'. A '1' is added to the 3-bit down-count values, and a result of the addition and a 1-bit carry value are generated. The result of the addition and the 1-bit carry value are inputted to lower 4 bits c3, c2, c1 and c0 of the register REG2. The waveform pattern selection signals b4, b2, b3 and b1 are inputted to upper 4 bits of the register REG2, wherein the locations of the waveform pattern selection signals b3 and b2 are changed with each other because the types 'B' and 'C' of the in-phase waveform pattern and the types 'C' and 'B' of the quadrature phase waveform pattern have the symmetric characteristics.

The 8-bit register REG2 generates an 8-bit in-phase address signal 25b every period of the clock signal CLK. A row address of the dual-port memory 26 is designated based on the upper 4 bits of the in-phase address signal 25a, and a column address of the dual-port memory 26 is designated based on the lower 3 bits of the in-phase address signal 25a. Accordingly, the lower 3 bits of the in-phase address signal 25a sequentially vary while the upper 4 bits of the in-phase address signal 25a are fixed. Thus, eight columns are designated in the sequence of '000', '001', '010', '011', '100', '101', '110' and '111' (in the direction 42 of FIG. 3) while the row address is designated by the upper 4 bits of the in-phase address signal 25a, so that eight in-phase sample values are read from the dual-port memory 26.

In addition, a row address of the dual-port memory 26 is designated based on the upper 4 bits of the quadrature phase address signal 25a, and a column address of the dual-port memory 26 is designated based on the lower 3 bits of the quadrature address signal 25a. Accordingly, the lower 3 bits of the quadrature address signal 25a sequentially vary while the upper 4 bits of the quadrature address signal 25a are fixed.

Thus, eight columns are designated in the sequence of '1000', '0111', '0110', '0101', '0100', '0011', '0010' and '0001' (in the direction 44 of FIG. 3) while the row address is designated by the upper 4 bits of the quadrature address signal 25a, so that eight quadrature sample values are read from the dual-port memory 26.

Figure 8:
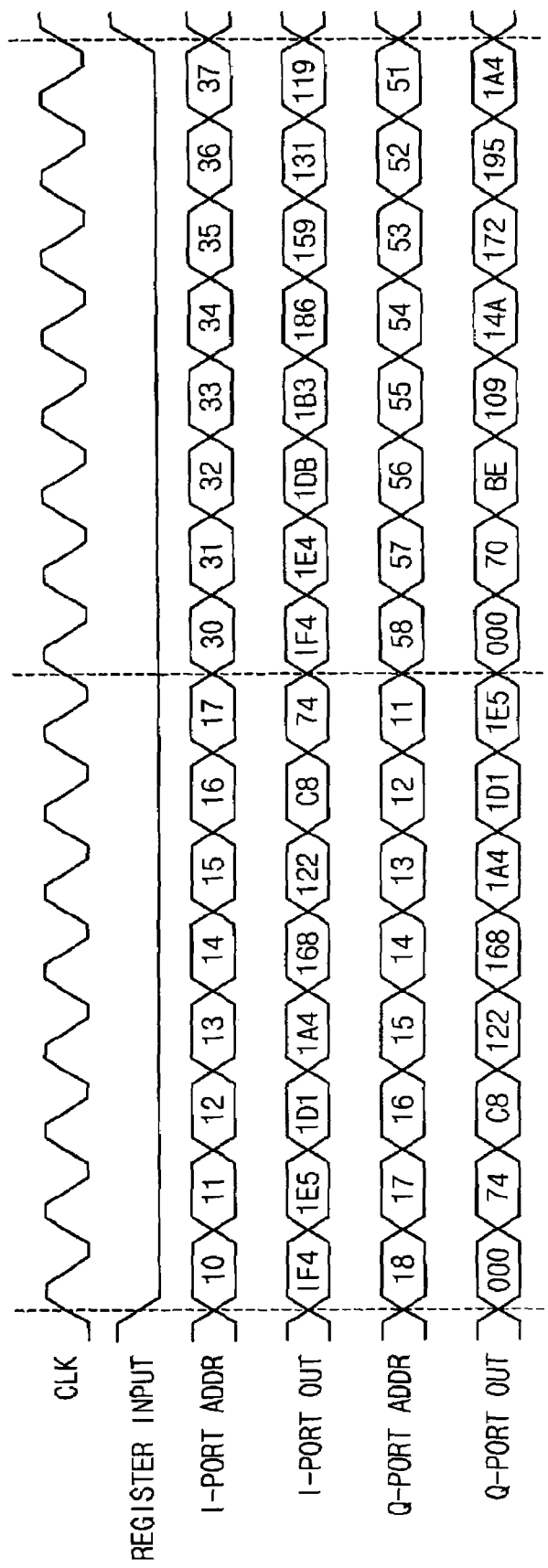
FIG. 8 is a timing diagram illustrating an addressing operation of the dual-port memory according to an exemplary embodiment of the present disclosure.

FIG. 8 is a timing diagram illustrating an addressing operation of the dual-port memory according to an exemplary embodiment of the present disclosure. Referring to FIG. 8, the sample values stored in the rows 1 and 3 of the dual-port memory 26 are designated by an I-port address to be sequentially outputted via an I-port in response to the clock signal CLK, and the sample values stored in the columns 1 and 5 of the dual-port memory 26 are designated by a Q-port address to be outputted in a reverse sequence via a Q-port in response to the clock signal CLK.

Figure 9:
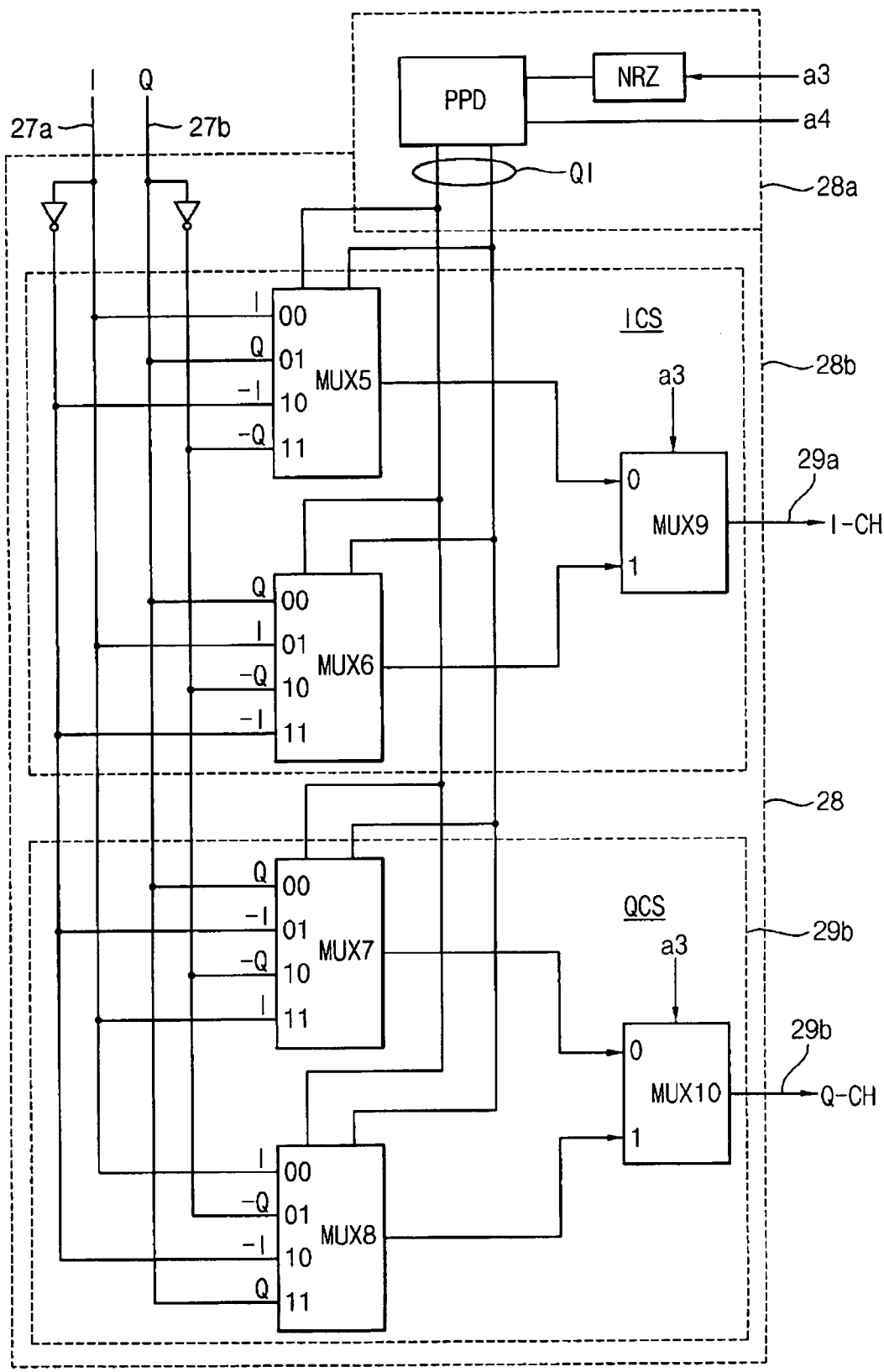
FIG. 9 is a block diagram illustrating a signal provider according to an exemplary embodiment of the present disclosure.

FIG. 9 is a block diagram illustrating a signal provider according to an exemplary embodiment of the present disclosure. Referring to FIG. 9, the signal provider 28 includes a decision block 28a and a channel selector 28b.

The decision block 28a includes a Non-Return-to-Zero (NRZ) processor and a Pattern Phase Decision (PPD) block. The NRZ processor generates '−1' when the present bit a3 has a logic status '0' and generates '1' when the present bit a3 has a logic status '1'. The PPD block generates a phase selection signal, i.e. a Quadrature Index (QI) of a next waveform. The QI of the next waveform is obtained by adding a quadrature number, to which a present waveform belongs, to the output of the NRZ processor when the present bit a3 is the same as the previous bit a4. The QI of the next waveform is the same as the quadrature number, to which a present waveform belongs, when the present bit a3 is not the same as the previous bit a4.

The NRZ processor may be implemented by a logic circuit performing the following algorithm:

if a3 = 0, y = −1
else y = 1
(y represents the output of the NRZ processor)

The PPD may be implemented by a logic circuit performing the following algorithm:

if a3 = a4, QI = QI + y
else QI = QI
(if QI>3, QI = 0, else QI = QI)

The channel selector 28b includes an in-phase channel selector ICS and a quadrature phase channel selector QCS. The in-phase channel selector ICS includes multiplexers MUX5, MUX6 and MUX9. The in-phase channel selector ICS selects one of the in-phase waveform data 27a and the quadrature phase waveform data 27b in response to the present bit a3 and the QI value and outputs a continuous GMSK in-phase channel signal 29a.

The MUX5 receives I, Q, −I and −Q, which are provided from the dual-port memory 26, via input terminals 00, 01, 10, 11, respectively, and selects one of I, Q, −I and −Q based on the QI value. The MUX6 receives Q, I, −Q and −I, which are provided from the dual-port memory 26, via input terminals 00, 01, 10, 11, respectively, and selects one of the Q, I, −Q and −I based on the QI value. The MUX9 selects one of the outputs of the MUX5 and MUX6 and outputs the selected output as an I-CH signal 29a.

The quadrature phase channel selector QCS includes multiplexers MUX7, MUX8 and MUX10. The quadrature phase channel selector QCS selects one of the in-phase waveform data 27a and the quadrature phase waveform data 27b in response to the present bit a3 and the QI value and outputs a continuous GMSK quadrature phase channel signal 29b.

The selection algorithm of the channel selector 28b is summarized in Table 1.

TABLE 1

|  | Present bit a3 | |
| --- | --- | --- |
| QI | a3 = 0 | a3 = 1 |
| QI = 00 | I(n + 1) = In | I (n + 1) = Qn |
|  | Q(n + 1) = Qn | Q (n + 1) = In |
| QI = 01 | I(n + 1) = Qn | I(n + 1) = In |
|  | Q(n + 1) = −In | Q(n + 1) = −Qn |
| QI = 10 | I(n + 1) = −In | I(n + 1) = −Qn |
|  | Q(n + 1) = −Qn | Q(n + 1) = −In |
| QI = 11 | I(n + 1) = −Qn | I(n + 1) = −In |
|  | Q(n + 1) = In | Q(n + 1) = Qn |

The MUX7 receives Q, I, −Q and −I, which are provided from the dual-port memory 26, via input terminals 00, 01, 10, 11, respectively, and selects one of Q, I, −Q and −I based on the QI value. The MUX8 receives I, −Q, −I and Q, which are provided from the dual-port memory 26, via input terminals 00, 01, 10, 11, respectively, and selects one of I, −Q, −I and Q based on the QI value. The MUX10 selects one of the outputs of the MUX7 and MUX8 and outputs the selected output as a Q-CH signal 29b.

Figure 10A:
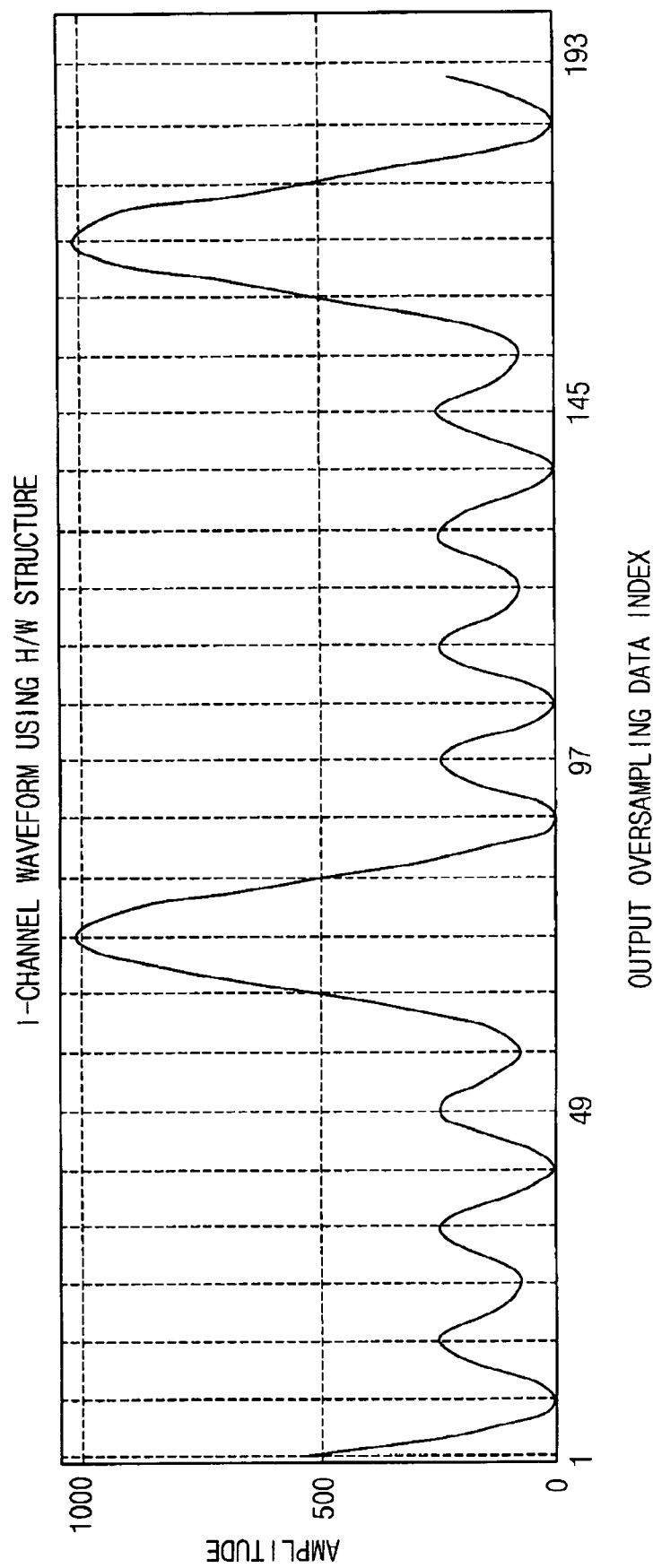
FIGS. 10A and 10B are graphs respectively illustrating an I-channel waveform and a Q-channel waveform depending upon an input bit stream in the GMSK modulator according to an exemplary embodiment of the present disclosure.
Figure 10B:
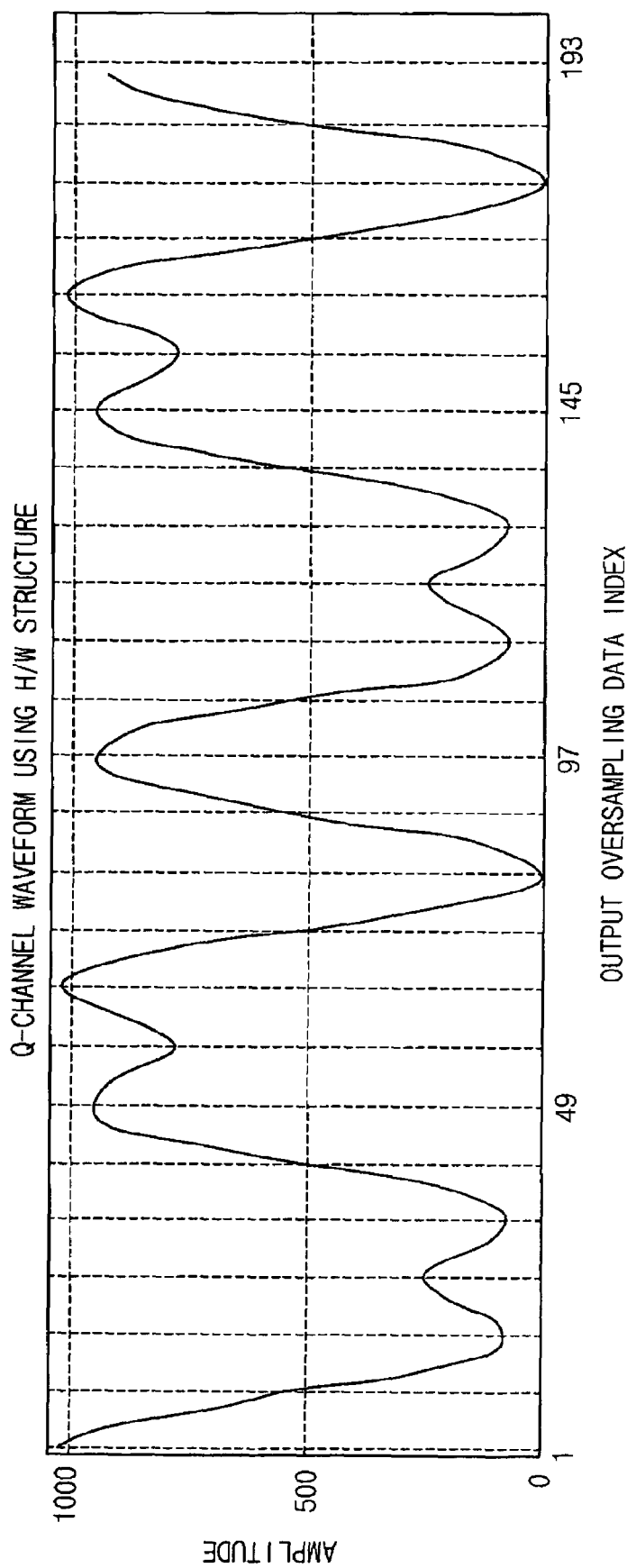

FIGS. 10A and 10B are graphs respectively illustrating an I-channel waveform (or an I channel output waveform) and a Q-channel waveform (or a Q channel output waveform) depending upon an input bit stream in the GMSK modulator according to an exemplary embodiment of the present disclosure. The input bit stream has 24 bits, i.e., "1 1 0 1 1 0 1 0 1 0 0 0/1 1 0 1 1 0 1 0 1 0 0 0".

FIGS. 11 and 12 are tables showing modulation processes for generating the I-channel waveform of FIG. 10A and Q-channel waveform of FIG. 10B. FIG. 11 shows a modulation process for generating the I-channel waveform of FIG. 10A. FIG. 12 shows a modulation process for generating the Q-channel waveform of FIG. 10B.

According to the exemplary embodiments of the present disclosure, the GMSK modulator can reduce the amount of memory needed for the look-up table compared with conventional GMSK modulators, so that the size of the GMSK modulator may be reduced. In addition, it becomes easier to implement the GMSK modulator as a one-chip solution because the complexity of the layout design may be reduced.

While the exemplary embodiments of the present disclosure and their advantages have been described in detail, it should be understood that various changes, substitutions and alterations may be made herein by those of ordinary skill in the pertinent art without departing from the scope of the invention.

What is claimed is:

1. A Gaussian Minimum Shift Keying (GMSK) modulator comprising:
    a dual-port memory configured to respectively output in-phase waveform data and quadrature phase waveform data to a first port and a second port in response to an in-phase waveform address signal and a quadrature phase waveform address signal, the in-phase waveform data and quadrature phase waveform data being stored in the dual-port memory;
    an address generator configured to generate the in-phase waveform address signal and the quadrature phase waveform address signal based on a differential encoded bit stream; and
    a signal provider configured to select one of the in-phase waveform data and the quadrature phase waveform data in response to the differential encoded bit stream, and configured to output a continuous GMSK in-phase channel signal and a continuous GMSK quadrature phase channel signals,
    wherein the address generator includes:
    a serial-to-parallel converter configured to output parallel data having at least one previous bit of the differential encoded bit stream, a present bit of the differential encoded bit stream and at least one next bit of the differential encoded bit stream;
    a pattern selector configured to generate at least one waveform pattern selection signal for designating one of the in-phase and quadrature phase waveform pattern samples in response to the present bit;
    an in-phase address generator configured to generate an in-phase address signal that sequentially designates each of sample values of the in-phase and quadrature phase waveform pattern samples selected by the at least one waveform patter selection signal and
    a quadrature phase address generator configured to generate a quadrature phase address signal that designates in a reverse sequence each of The sample values of the in-phase and quadrature phase waveform pattern samples selected by the at least one waveform pattern selection signal.

2. The GMSK modulator of claim 1, wherein the waveform pattern data stored in the dual-port memory respectively includes a plurality of in-phase waveform pattern samples (S1 (θi)) and a plurality of quadrature phase waveform pattern samples (S2 (θi)), wherein $0 \leq \theta i \leq \pi/2$.

3. The GMSK modulator of claim 2, wherein an initial sample value of the in-phase waveform pattern samples, common sample values of the in-phase and quadrature phase waveform pattern samples, and an initial sample value of the quadrature phase waveform pattern samples are stored in the dual-port memory in the order named.

4. The GMSK modulator of claim 3, wherein the initial sample value of the in-phase waveform pattern samples and the common sample values of the in-phase waveform pattern samples are sequentially stored in the dual-port memory, and the initial sample value of the quadrature phase waveform pattern samples and the common sample values of the quadrature phase waveform pattern samples are stored in the dual-port memory, wherein The common sample values of the quadrature phase waveform pattern samples are stored in a reverse sequence in the dual-port memory.

5. The GMSK modulator of claim 1, wherein the pattern selector outputs the at least one previous bit and the at least one next bit as the at least one waveform pattern selection signal when the present bit has a first logic status, and the pattern selector outputs an inverted signal of the at least one previous bit and an inverted signal of the at least one next bit as the at Least one waveform pattern selection signal when the present bit has a second logic status.

6. The GMSK modulator of claim 5, wherein the in-phase address generator includes:
    an up-counter; and a first register that receives a up-count value of the up-counter as a lower address and the at least one waveform pattern selection signal as an upper address, and configured to output the in-phase address signal.

7. The GMSK modulator of claim 6, wherein the quadrature phase address generator includes:
a down counter;
an adder configured to add a down-count value of the down counter to a logic '1'; and
a second register that receives the down-count value of the down-counter as a lower address and the at least one waveform pattern selection signal as an upper address, and configured to output the quadrature phase address signal.

8. The GMSK modulator of claim 7, wherein bit locations of middle bits of the waveform pattern selection signal are changed with each other when the middle bits of the waveform pattern selection signal are inputted to the upper address of the second register.

9. A Gaussian Minimum Shift Keying (GMSK) modulator comprising:
a dual-port memory configured to respectively output in-phase waveform data and quadrature phase waveform data to a first port and a second port in response to an in-phase waveform address signal and a quadrature phase waveform address signal, the in-phase waveform data and quadrature phase waveform data being stored in the dual-port memory;
an address generator configured to generate the in-phase waveform address signal and the quadrature phase waveform address signal based on a differential encoded bit stream; and
a signal provider configured to select one of the in-phase waveform data and the quadrature phase waveform data in response to the differential encoded bit stream, and configured to output a continuous GMSK in-phase channel signal and a continuous GMSK quadrature phase channel signal,
wherein the signal provider includes:
a decision block configured to generate a phase selection signal based on the present bit and the at least one next bit of the differential encoded bit stream;
an in-phase channel selector configured to select one of the in-phase waveform data and the quadrature phase waveform data in response to the present bit and the phase selection signal, and configured to output a continuous GMSK in-phase channel signal; and
a quadrature phase channel selector configured to select one of the in-phase waveform data and the quadrature phase waveform data in response to the present bit and the phase selection signal, and configured to output a continuous GMSK quadrature phase channel signal.

10. A Gaussian Minimum Shift Keying (GMSK) modulation method, comprising:
preparing a dual-port memory in which in-phase waveform data and quadrature phase waveform data are stored, the dual-port memory respectively outputting the in-phase waveform data and the quadrature phase waveform data to a first port and a second port in response to an in-phase waveform address signal and a quadrature phase waveform address signal;
generating the in-phase waveform address signal and the quadrature phase waveform address signal based on a differential encoded bit stream; and
selecting one of the in-phase waveform data and the quadrature phase waveform data in response to the differential encoded bit stream to output a continuous GMSK in-phase channel signal and a continuous GMSK quadrature phase channel signal,
wherein the generating of the in-phase waveform address signal includes:
outputting parallel data having at least one previous bit of the differential encoded bit stream, a present bit of the differential encoded bit stream and at least one next bit of the differential encoded bit stream;
generating at least one waveform pattern selection signal for designating one of the in-phase and quadrature phase waveform pattern samples in response to the present bit;
generating a quadrature phase address signal that sequentially designates each of sample values of the in-phase and quadrature phase waveform pattern samples selected by the at least one waveform pattern selection signal; and
generating a quadrature phase address signal that designates in a reverse sequence each of the sample values of the in-phase and quadrature phase waveform pattern samples selected by the at least one waveform pattern selection signal.

11. The GMSK modulator of claim 10, wherein the waveform pattern data stored in the dual-port memory respectively includes a plurality of in-phase waveform pattern samples (S1 (θi)) and a plurality of quadrature phase waveform pattern samples (S2 (θi)), wherein $0 \leq \theta i \leq \pi/2$.

12. The GMSK modulation method of claim 11, wherein an initial sample value of the in-phase waveform pattern samples, common sample values of the in-phase and quadrature phase waveform pattern samples, and an initial sample value of the quadrature phase waveform pattern samples are stored in the dual-port memory in the order named.

13. The GMSK modulation method of claim 12, wherein the initial sample value of the in-phase waveform pattern samples and the common sample values of the in-phase waveform pattern samples are sequentially stored in the dual-port memory, and the initial sample value of the quadrature phase waveform pattern samples and the common sample values of the quadrature phase waveform pattern samples are stored in the dual-port memory, wherein the common sample values of the quadrature phase waveform pattern samples are stored in a reverse sequence in the dual-port memory.

14. The GMSK modulation method of claim 10, wherein the at least one previous bit and the at least one next bit are outputted as the at least one waveform pattern selection signal when the present bit has a first logic status, and an inverted signal of the at least one previous bit and an inverted signal of the at least one next bit arc outputted as the at least one waveform pattern selection signal when the present bit has a second logic status.

15. The GMSK modulation method of claim 14, wherein the generating of the in-phase waveform address signal includes:
up-counting a clock signal; and
receiving an up-count value as a lower address and the at least one waveform pattern selection signal as an upper address to output the in-phase address signal.

16. The GMSK modulation method of claim 15, wherein the generating of the quadrature phase waveform address signal includes:
down-counting the clock signal;
adding a down-count value to a logic '1'; and
receiving the added result as a lower address and the at least one waveform pattern selection signal as an upper address to output the quadrature phase address signal.

17. The GMSK modulation method of claim 16, wherein bit locations of middle bits of the waveform pattern selection signal are changed with each other when the middle bits of the waveform pattern selection signal are inputted to the upper address of the second register.

18. A Gaussian Minimum Shift Keying (GMSK) modulation method, comprising:

preparing a dual-port memory in which in-phase waveform data and quadrature phase waveform data are stored, the dual-port memory respectively outputting the in-phase waveform data and the quadrature phase waveform data to a first port and a second port in response to an in-phase waveform address signal and a quadrature phase waveform address signal;

generating the in-phase waveform address signal and the quadrature phase waveform address signal based on a differential encoded bit stream; and selecting one of the in-phase waveform data and the quadrature phase waveform data in response to the differential encoded bit stream to output a continuous GMSK in-phase channel signal and a continuous GMSK quadrature base channel signal, wherein the selecting of one of the in-phase waveform data and the quadrature phase waveform data in response to the differential encoded bit stream to output a continuous GMSK in-phase channel signal and a continuous GMSK quadrature phase channel signal includes:

generating a phase selection signal based on the present bit and the at least one next bit of the differential encoded bit stream;

selecting one of the in-phase waveform data and the quadrature phase waveform data in response to the present bit and the phase selection signal to output the continuous GMSK in-phase channel signal; and selecting one of the in-phase waveform data and the quadrature phase waveform data in response to the present bit and the phase selection signal to output the continuous GMSK quadrature phase channel signal.

19. A method of generating waveform data, comprising:

storing $2^m$ in-phase waveform patterns having $2^n$ k-bit samples S1 ($\theta i$) ($0 \leq \theta i \leq \pi/2$) in a first region of a dual-port memory, the dual-port memory having a size of k-bit×$2^m$ rows×($2^n$+1) columns, the first region corresponding to $2^m$ rows×$2^n$ columns, wherein k, m and n are natural numbers;

storing an initial sample S ($\theta_0$) of $2^m$ quadrature phase waveform patterns in a second region of the dual-port memory, the $2^m$ quadrature phase waveform patterns having $2^n$ k-bit samples S2 ($\theta i$) ($0 \leq \theta i \leq \pi/2$) and having symmetric characteristics with respect to the $2^m$ in-phase waveform patterns, the second region corresponding to a ($2^n$+1)th column region;

converting an input bit stream into (p+q+1)-bit parallel data having at least one previous bit (p), a present bit, and at least one next bit (q), wherein m =p+q;

generating (p+q)-bit data or an inverted (p+q)-bit data in response to a logic status of a present bit of the (p+q+1)-bit parallel data, the (p+q)-bit data having the at least one previous bit and the at least one next bit, but not the present bit;

generating a first address signal for sequentially allocating $2^n$ in-phase samples of a designated row to a first column through a $2^n$th column in response to the (p+q)-bit data or the inverted (p+q)-bit data;

generating a second address signal for allocating, in a reverse sequence, $2^n$ quadrature phase samples of the designated row to the $2^n$th column through a second column in response to the (p+q)-bit data or the inverted (p+q)-bit data;

outputting in-phase samples, which are accessed in response to the first address signal, to a first port of the dual-port memory; and outputting quadrature phase samples, which are accessed in response to the second address signal, to a second port of the dual-port memory.

20. The method of generating waveform data of claim 19, further comprising:

generating a channel selection signal in response to the present bit and the at least one previous bit; and providing the in-phase samples and the quadrature phase samples to an in-phase channel or a quadrature phase channel in response to the channel selection signal.

21. The method of generating waveform data of claim 20, wherein p is 2, and q is 2.

22. The method of generating waveform data of claim 21, wherein the $2^m$ in-phase waveform patterns are divided into four groups, each of the four groups having the same waveform pattern, a first group being stored in rows 0, 1, 8 and 9 of the dual-port memory, a second group being stored in rows 2, 3, 10 and 11 of the dual-port memory, a third group being stored in rows 4, 5, 12 and 13 of the dual-port memory, and a fourth group being stored in rows 6, 7, 14 and 15 of the dual-port memory.

23. The method of generating waveform data of claim 22, wherein the $2^m$ quadrature phase waveform patterns are divided into four groups, each of the four groups having the same waveform pattern, first and fourth groups of the $2^m$ quadrature phase waveform patterns being symmetrically corresponding to the first and the fourth groups of the $2^m$ in-phase waveform patterns, a second group of the $2^m$ quadrature phase waveform patterns corresponding to the third group of the $2^m$ in-phase waveform patterns, and a third group of the $2^m$ quadrature phase waveform patterns corresponding to the second group of the $2^m$ in-phase waveform patterns.

24. The method of generating waveform data of claim 19, wherein the input bit stream includes a differential encoding bit stream.

25. An apparatus for generating waveform data, comprising:

a dual-port memory tat stores $2^m$ in-phase waveform patterns having $2^n$ k-bit samples S1 ($\theta i$) ($0 \leq \theta i \leq \pi/2$)) in a first region of a dual-port memory and stores an initial sample S ($\theta_0$) of $2^m$ quadrature phase waveform patterns in a second region of the dual-port memory, the dual-pod memory having a size of k-bit×$2^m$ rows×($2_n$+1) columns, the first region corresponding to $2^m$ rows×$2^n$ columns, wherein k, m and n are natural numbers, the 2quadrature phase waveform patterns having $2^n$ k-bit samples S2 ($\theta i$) ($0 \leq \theta i \leq \pi/2$) and having symmetric characteristics with respect to the $2^m$ in-phase waveform patterns, the second region corresponding to a ($2^n$+1)th column region;

a serial-to-parallel convener configured to convert an input bit stream into (p+q+1)-bit parallel data having at least one previous bit (p), a present bit, and at least one next bit (q), wherein m =p+q;

a bit decision block configured to generate (p+q)-bit data or an inverted (p+q)-bit data in response to a logic status of a present bit of the (p+q+1)-bit parallel data, the (p+q)-bit data having the at least one previous bit and the at least one next bit, but not the present bit;

a first address generator configured to generate a first address signal for sequentially allocating $2^n$ in-phase samples of a designated row to a first column through a $2^n$th column in response to the (p+q)-bit data or the inverted (p+q)-bit data; and a second address generator configured to generate a second address signal for allocating, in a reverse sequence, $2^n$ quadrature phase samples of the designated row to the $2^n$th column through a second column in response to the (p+q)-bit data or the inverted (p+q)-bit data, wherein the apparatus outputs in-phase samples, which are accessed in response to the first address signal, to a first port of the dual-port memory, and outputs quadrature phase samples, which are accessed in response to the second address signal, to a second port of the dual-port memory.

26. The apparatus of claim 25, wherein the serial-to-parallel converter includes a 5-bit shift register configured to shift the input bit stream to output 5-bit parallel data.

27. The apparatus of claim 25, wherein the first address generator includes:

an up-counter configured to up-count a clock signal having a frequency $2^n$ times as high as a frequency of the serial-to-parallel converter to sequentially generate an n-bit count value in a range from 0 to $(2^n-1)$; and a first register configured to store the (p+q)-bit data or the inverted (p+q)-bit data at upper (p+q) bits of the first register, configured to store the n-bit count value at lower n bits of the first register, and configured to sequentially generate $(2^{n-1})$ (p+q+n)-bit first address signals.

28. The apparatus of claim 25, wherein the second address generator includes:

a down-counter configured to down-count the clock signal having a frequency $2^n$ times as high as a frequency of the serial-to-parallel converter to sequentially generate an n-bit count value in a range from $(2^{n-1})$ to 1;

an adder configured to add the n-bit value to a logic '1'; and a second register configured to store the (p+q)-bit data or the inverted (p+q)-bit data at upper (p+q) bits of the second register, configured to store an output of the adder at lower (n+1) bits of the second register, and configured to sequentially generate (p+q+n+1)-bit second address signals.

* * * * *